United States Patent
Kodama et al.

(10) Patent No.: US 10,504,369 B2
(45) Date of Patent: Dec. 10, 2019

(54) SIGNAL DEVICE AND COLLISION AVOIDANCE SYSTEM

(71) Applicant: The Yokohama Rubber Co., LTD., Minato-ku, Tokyo (JP)

(72) Inventors: Yuji Kodama, Hiratsuka (JP); Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 229 days.

(21) Appl. No.: 15/539,119

(22) PCT Filed: Dec. 26, 2014

(86) PCT No.: PCT/JP2014/084565
§ 371 (c)(1),
(2) Date: Jun. 22, 2017

(87) PCT Pub. No.: WO2016/103461
PCT Pub. Date: Jun. 30, 2016

(65) Prior Publication Data
US 2017/0352274 A1 Dec. 7, 2017

(51) Int. Cl.
*G08G 1/16* (2006.01)
*B60Q 1/38* (2006.01)
(Continued)

(52) U.S. Cl.
CPC ............... *G08G 1/164* (2013.01); *B60Q 1/38* (2013.01); *B60Q 1/525* (2013.01); *B60R 21/00* (2013.01); *G08G 1/16* (2013.01); *G08G 1/166* (2013.01)

(58) Field of Classification Search
CPC .......... G08G 1/164; G08G 1/16; G08G 1/166; B60Q 1/38; B60Q 1/525; B60R 21/00
(Continued)

(56) References Cited

U.S. PATENT DOCUMENTS

| 6,894,608 B1 * | 5/2005 | Gunderson | B60Q 1/525 340/425.5 |
| 2005/0062597 A1 * | 3/2005 | Su | B60Q 1/2665 340/475 |

(Continued)

FOREIGN PATENT DOCUMENTS

| DE | 10 2012 018 120 | 3/2013 |
| EP | 1 270 327 | 1/2003 |

(Continued)

OTHER PUBLICATIONS

International Search Report for International Application No. PCT/JP2014/084565 dated Feb. 10, 2015, 4 pages, Japan.

*Primary Examiner* — Marthe Y Marc-Coleman
(74) *Attorney, Agent, or Firm* — Thorpe North & Western

(57) ABSTRACT

A turn signal device comprising: a right-turn signal and a left-turn signal provided in a host vehicle; an operation device for generating operation signals; an acquisition unit that acquires determination signals indicating determination results regarding the risk of a collision between the host vehicle and a following vehicle; a normal situation control unit that, based on the operation signals, outputs normal situation control signals such that light-emitting units for either or both the left-turn signal and the right-turn signal light up sequentially from an inner side to an outer side in the vehicle width direction; and a dangerous situation control unit that outputs dangerous situation control signals such that, when a determination signal indicates a determination result that there is a risk of collision, the light-emitting units for both the left-turn signal and the right-turn signal light up sequentially from the outer side to the inner side.

12 Claims, 7 Drawing Sheets

(51) Int. Cl.
*B60R 21/00* (2006.01)
*B60Q 1/52* (2006.01)

(58) Field of Classification Search
USPC .......................................................... 701/301
See application file for complete search history.

(56) References Cited

U.S. PATENT DOCUMENTS

2009/0051522 A1 2/2009 Perkins
2009/0051523 A1 2/2009 Perkins
2016/0121791 A1 5/2016 Shimizu

FOREIGN PATENT DOCUMENTS

| | | | |
|---|---|---|---|
| JP | 2002-163790 | | 6/2002 |
| JP | 2005-349989 | | 12/2005 |
| JP | 2005349989 A | * | 12/2005 |
| JP | 2008-230568 | | 10/2008 |
| JP | 2008230568 A | * | 10/2008 |
| JP | 2010-264912 | | 11/2010 |
| JP | 2010264912 A | * | 11/2010 |
| JP | 2011-116356 | | 6/2011 |
| JP | 2014-229510 | | 12/2014 |
| WO | WO 2007/138713 | | 12/2007 |
| WO | WO 2009/029510 | | 3/2009 |
| WO | WO 2014/192369 | | 12/2014 |

\* cited by examiner

VEHICLE WIDTH DIRECTION

SIGNAL DEVICE AND COLLISION AVOIDANCE SYSTEM

TECHNICAL FIELD

The present technology relates to a turn signal device and a collision avoidance system.

BACKGROUND ART

A technique in which a collision between vehicles is avoided on the basis of a light-up state of a turn signal device and traveling conditions of the vehicles has been proposed, such as that disclosed in Japanese Unexamined Patent Application Publication No. 2002-163790A.

SUMMARY

Conventionally, the state of a vehicle is communicated to the perimeter by controlling the light-up state of a turn signal device. For example, a right turn signal is flashed when the vehicle makes a right turn, a left turn signal is flashed when the vehicle makes a left turn, and both the right turn signal and the left turn signal are flashed simultaneously when parking the vehicle on a street. If the turn signal device can be used to effectively catch the attention of the driver of a following vehicle traveling behind the host vehicle in which the turn signal device is provided, it may be possible to avoid a collision between the host vehicle and the following vehicle.

An object of aspects of the present technology is to provide a turn signal device and a collision avoidance system that make it possible to avoid a collision between a host vehicle and a following vehicle.

According to a first aspect of the present technology, a turn signal device is provided. The turn signal device includes: a right turn signal, provided on a right side of a rear part of a host vehicle, the right turn signal having a plurality of light-emitting units arranged in a vehicle width direction of the host vehicle; a left turn signal, provided on a left side of the rear part of the host vehicle, the left turn signal having a plurality of light-emitting units arranged in the vehicle width direction of the host vehicle; an operation device, provided in a driver cab of the host vehicle, the operation device being capable of generating an operation signal for causing one or both of the right turn signal and the left turn signal to operate in response to an operation made by a driver; an acquisition unit that acquires a determination signal indicating a determination result of whether or not there is a risk of a collision between the host vehicle and a following vehicle traveling behind the host vehicle; a normal situation control unit that, on the basis of the operation signal, outputs a normal situation control signal such that the plurality of light-emitting units in one or both of the right turn signal and the left turn signal light up sequentially from an inner side to an outer side with respect to the vehicle width direction; and a dangerous situation control unit that, upon the determination signal indicating a determination result that there is a risk of the collision being acquired, outputs a dangerous situation control signal such that the plurality of light-emitting units in both of the right turn signal and the left turn signal light up sequentially from the outer side to the inner side with respect to the vehicle width direction.

In the first aspect of the present technology, the turn signal device may further include a switching unit that, upon the determination signal indicating a determination result that there is a risk of the collision being acquired while the normal situation control signal is being outputted, stops the output of the normal situation control signal and outputs the dangerous situation control signal.

In the first aspect of the present technology, upon the determination signal indicating a determination result that there is no risk of the collision being acquired while the dangerous situation control signal is being outputted, the switching unit may stop the output of the dangerous situation control signal and output the normal situation control signal.

In the first aspect of the present technology, the dangerous situation control unit may change one or both of a time at which the respective pluralities of light-emitting units start lighting up, and a light emission amount of those light-emitting units, on the basis of a level of the risk of the collision.

According to a second aspect of the present technology, a collision avoidance system is provided. The collision avoidance system includes: a detection device, provided in a rear part of a host vehicle, the detection device detecting a following vehicle traveling behind the host vehicle in a non-contact manner; a determination unit that, on the basis of a detection result from the detection device, determines whether or not there is a risk of a collision between the host vehicle and the following vehicle; and the turn signal device according to the first aspect, the turn signal device being controlled on the basis of a determination result from the determination unit.

According to aspects of the present technology, a turn signal device and a collision avoidance system that make it possible to avoid a collision between a host vehicle and a following vehicle are provided.

DETAILED DESCRIPTION

Embodiments of the present technology will be described with reference to the drawings. However, the present technology is not limited to these embodiments.

Constituents of the embodiments described below can be combined with one another as appropriate. In addition, there are also cases where some of the constituents are not used.

First Embodiment

Figure 1:
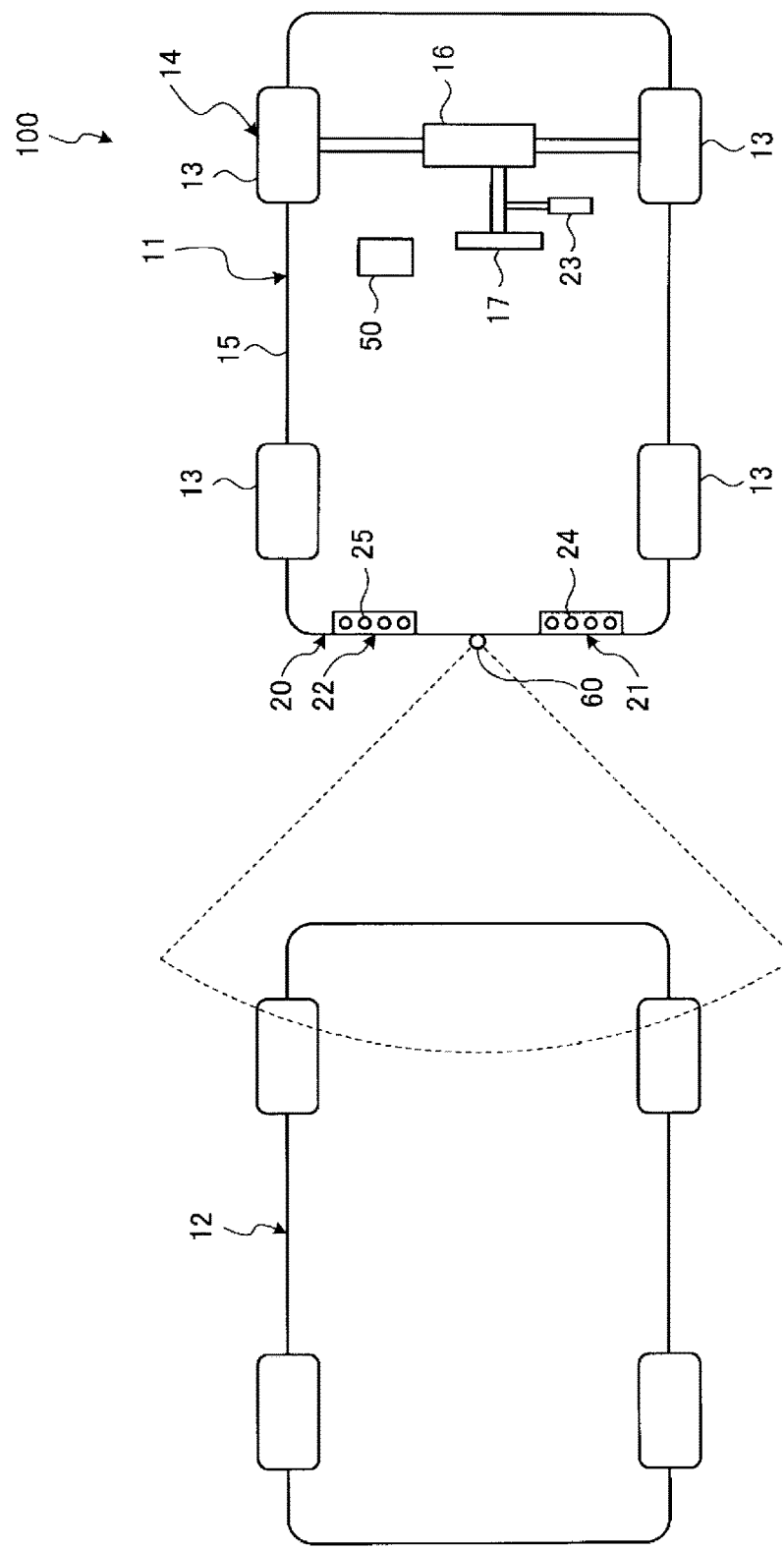
FIG. 1 is a schematic diagram illustrating an example of a collision avoidance system according to an embodiment.

A first embodiment will now be described. FIG. 1 is a schematic diagram illustrating an example of a collision avoidance system 100 according to the present embodiment. The collision avoidance system 100 enables a host vehicle 11 and a following vehicle 12 traveling behind the host vehicle 11 to avoid a collision. The collision avoidance system 100 reduces damage caused by collisions between the host vehicle 11 and the following vehicle 12. The collision avoidance system 100 prevents collisions between the host vehicle 11 and the following vehicle 12. The collision avoidance system 100 is at least partially provided in the host vehicle 11.

The host vehicle 11 includes: a driving apparatus 14 including tires 13; a vehicle body 15 supported by the driving apparatus 14; a steering apparatus 16 that enables an advancement direction of the host vehicle 11 to be changed; a steering operation unit 17 for operating the steering apparatus 16; a turn signal device 20 for indicating the advancement direction of the host vehicle 11 to the exterior of the host vehicle 11; a detection device 60 that detects the following vehicle 12 in a non-contact manner; and a control device 50 that controls the host vehicle 11. The control device 50 includes a computer system such as an Engine Control Unit (ECU).

The turn signal device 20 includes: a right turn signal 21 provided on the right side of a rear part of the host vehicle 11; a left turn signal 22 provided on the left side of the rear part of the host vehicle 11; and an operation device 23 capable of generating operation signals for causing one or both of the right turn signal 21 and the left turn signal 22 to operate.

The host vehicle 11 has a driver cab that a driver occupies. The steering operation unit 17 and the operation device 23 are provided in the driver cab. The steering operation unit 17 and the operation device 23 are operated by the driver.

The steering operation unit 17 includes a steering wheel. The operation device 23 includes an operation lever provided on a steering column. An operation signal for causing one or both of the right turn signal 21 and the left turn signal 22 to operate is generated upon the operation device 23 being operated by the driver.

The detection device 60 detects the following vehicle 12 traveling behind the host vehicle 11 in a non-contact manner. The detection device 60 is provided in a rear part of the vehicle body 15 of the host vehicle 11. The detection device 60 includes a radar device. The radar device may be a millimeter wave radar device or a Doppler radar device. The radar device is capable of detecting the presence/absence of the following vehicle 12 traveling behind the host vehicle 11 by emitting radio waves or ultrasonic waves. In addition to the presence/absence of the following vehicle 12, the radar device is capable of detecting a relative position of the following vehicle 12 and a relative velocity of the following vehicle 12. The relative position of the following vehicle 12 includes the relative distance and orientation. Note that the detection device 60 may include at least one of a laser scanner and a three-dimensional rangefinder. The detection device 60 may include a camera capable of detecting an object in a non-contact manner by acquiring an optical image of the object.

Figure 2:
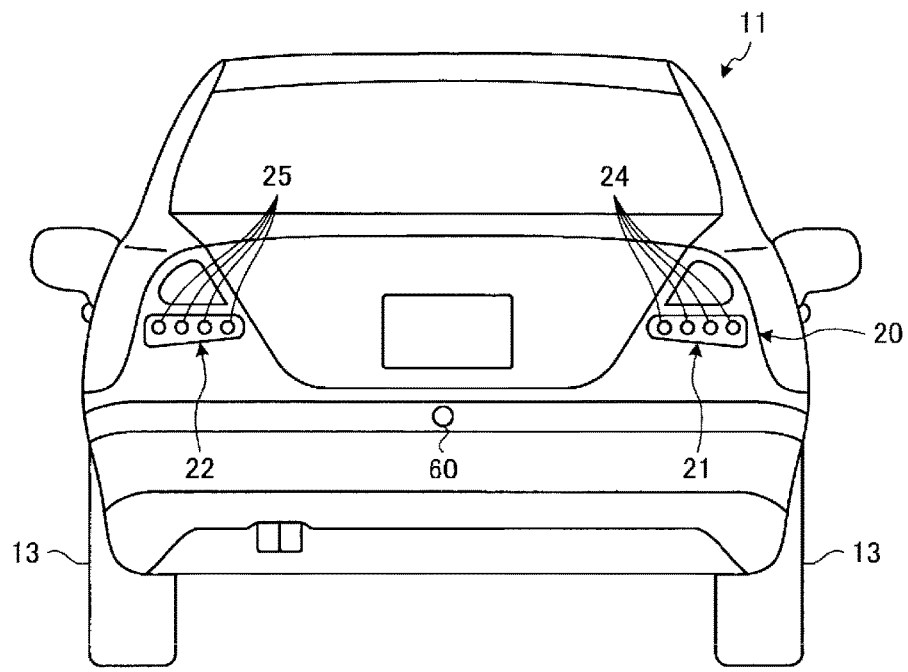
FIG. 2 is a schematic diagram illustrating an example of a host vehicle according to the embodiment.

FIG. 2 is a diagram illustrating an example of the host vehicle 11 according to the present embodiment from the rear. As illustrated in FIGS. 1 and 2, the detection device 60 is provided in a rear part of the vehicle body 15 of the host vehicle 11. The right turn signal 21 is provided on the right side of the rear part of the host vehicle 11. The left turn signal 22 is provided on the left side of the rear part of the host vehicle 11.

The right turn signal 21 has a plurality of light-emitting units 24 arranged in the vehicle width direction of the host vehicle 11. The left turn signal 22 has a plurality of light-emitting units 25 arranged in the vehicle width direction of the host vehicle 11. The light-emitting units 24 and the light-emitting units 25 include light-emitting diodes.

Figure 3:
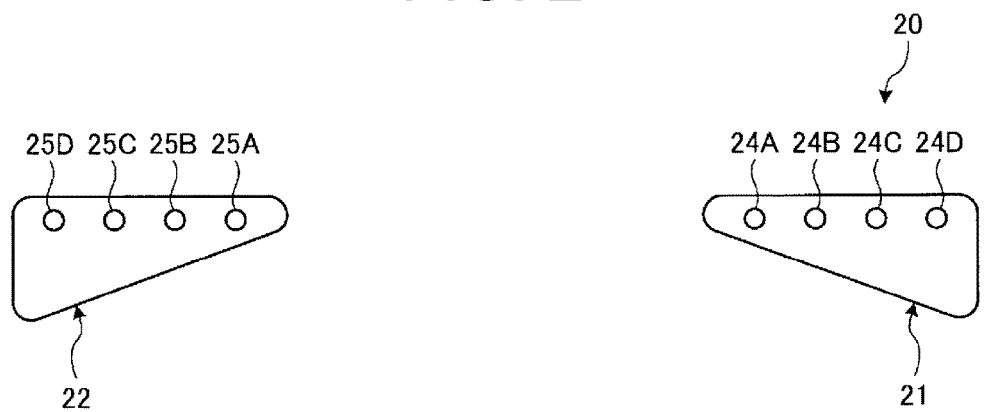
FIG. 3 is a schematic diagram illustrating an example of a turn signal device according to the embodiment.

FIG. 3 is a diagram illustrating the right turn signal 21 and the left turn signal 22 in an enlarged manner. As illustrated in FIG. 3, in the present embodiment, four light-emitting units 24 are provided. Four light-emitting units 25 are provided as well. In the description below, of the four light-emitting units 24, the light-emitting unit 24 arranged furthest inward in the vehicle width direction will be referred to as a light-emitting unit 24A as appropriate, the light-emitting unit 24 arranged next-furthest inward in the vehicle width direction will be referred to as a light-emitting unit 24B as appropriate, the light-emitting unit 24 arranged next-furthest inward in the vehicle width direction will be referred to as a light-emitting unit 24C as appropriate, and the light-emitting unit 24 arranged furthest outward in the vehicle width direction will be referred to as a light-emitting unit 24D as appropriate. Likewise, in the description below, of the four light-emitting units 25, the light-emitting unit 25 arranged furthest inward in the vehicle width direction will be referred to as a light-emitting unit 25A as appropriate, the light-emitting unit 25 arranged next-furthest inward in the vehicle width direction will be referred to as a light-emitting unit 25B as appropriate, the light-emitting unit 25 arranged next-furthest inward in the vehicle width direction will be referred to as a light-emitting unit 25C as appropriate, and the light-emitting unit 25 arranged furthest outward in the vehicle width direction will be referred to as a light-emitting unit 25D as appropriate.

Note that the right turn signal 21 may have three of the light-emitting units 24, or may have any desired number greater than or equal to five. Likewise, the left turn signal 22 may have three of the light-emitting units 25, or may have any desired number greater than or equal to five.

In the present embodiment, the turn signal device 20 is a turn signal device that uses a sequentially-lighting method. Thus, the turn signal device 20 is a so-called "flowing" turn signal device. The plurality of light-emitting units 24 of the right turn signal 21 light up sequentially in a predetermined order. Likewise, the plurality of light-emitting units 25 of the left turn signal 22 light up sequentially in a predetermined order.

Figure 4:
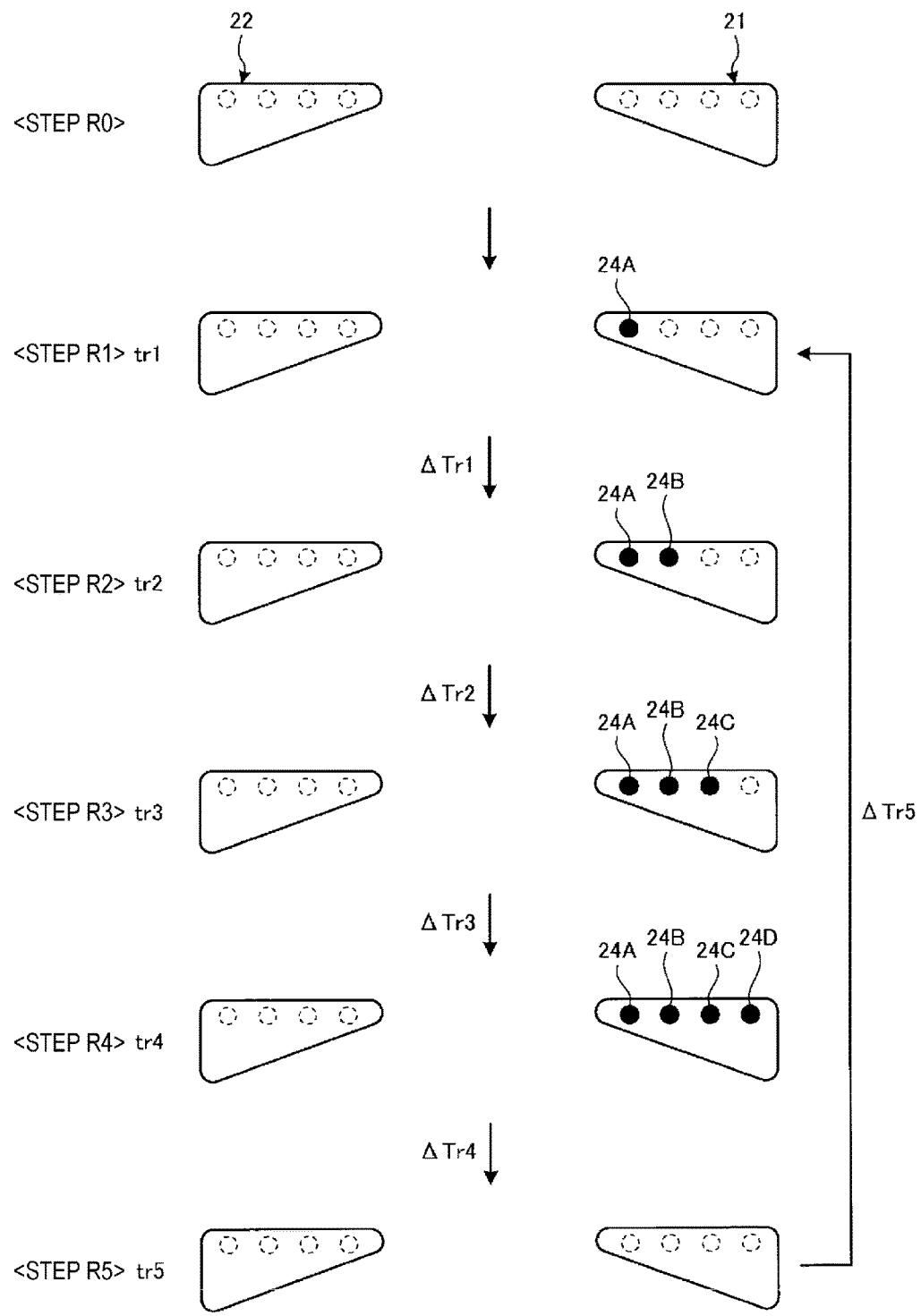
FIG. 4 is a schematic diagram illustrating an example of operations of the turn signal device according to the embodiment.

FIG. 4 is a schematic diagram illustrating an example of operations of the turn signal device 20 when the host vehicle 11 makes a right turn or changes lanes to the right. When turning the host vehicle 11 to the right or changing lanes to the right, the driver of the host vehicle 11 operates the operation device 23 such that the right turn signal 21 operates. As illustrated in FIG. 4, upon the operation device 23 being operated, the plurality of light-emitting units 24 of the right turn signal 21 light up in sequence from the inner side to the outer side with respect to the vehicle width direction.

As illustrated in FIG. 4, before the operation device 23 is operated, the light-emitting units 24 of the right turn signal 21 and the light-emitting units 25 of the left turn signal 22 are unlit (step R0).

Upon the operation device 23 being operated, the light-emitting unit 24A furthest inward with respect to the vehicle width direction lights up at a first point in time tr1 (step R1).

After the light-emitting unit 24A has lit up, the light-emitting unit 24B lights up at a second point in time tr2 (step R2). The second point in time tr2 is a point in time after the first point in time tr1 by an amount of time ΔTr1. The light-emitting unit 24B lights up with the light-emitting unit 24A remaining lit.

After the light-emitting unit 24B has lit up, the light-emitting unit 24C lights up at a third point in time tr3 (step R3). The third point in time tr3 is a point in time after the second point in time tr2 by an amount of time ΔTr2. The light-emitting unit 24C lights up with the light-emitting unit 24A and the light-emitting unit 24B remaining lit.

After the light-emitting unit 24C has lit up, the light-emitting unit 24D lights up at a fourth point in time tr4 (step R4). The fourth point in time tr4 is a point in time after the third point in time tr3 by an amount of time ΔTr3. The light-emitting unit 24D lights up with the light-emitting unit 24A, the light-emitting unit 24B, and the light-emitting unit 24C remaining lit.

After the light-emitting unit 24D has lit up, the light-emitting unit 24A, the light-emitting unit 24B, the light-emitting unit 24C, and the light-emitting unit 24D are extinguished at a fifth point in time tr5 (step R5). The fifth point in time tr5 is a point in time after the fourth point in time tr4 by an amount of time ΔTr4.

The process returns to step R1 after the light-emitting unit 24A, the light-emitting unit 24B, the light-emitting unit 24C, and the light-emitting unit 24D are extinguished. The amount of time from the fifth point in time tr5 to the first point in time tr1 is ΔTr5.

The operations from step R1 to step R5 are repeated until the operation of the operation device 23 is canceled and the operation signal is no longer being outputted from the operation device 23.

In the present embodiment, the amount of time ΔTr1, the amount of time ΔTr2, the amount of time ΔTr3, the amount of time ΔTr4, and the amount of time ΔTr5 are the same amount of time.

Figure 5:
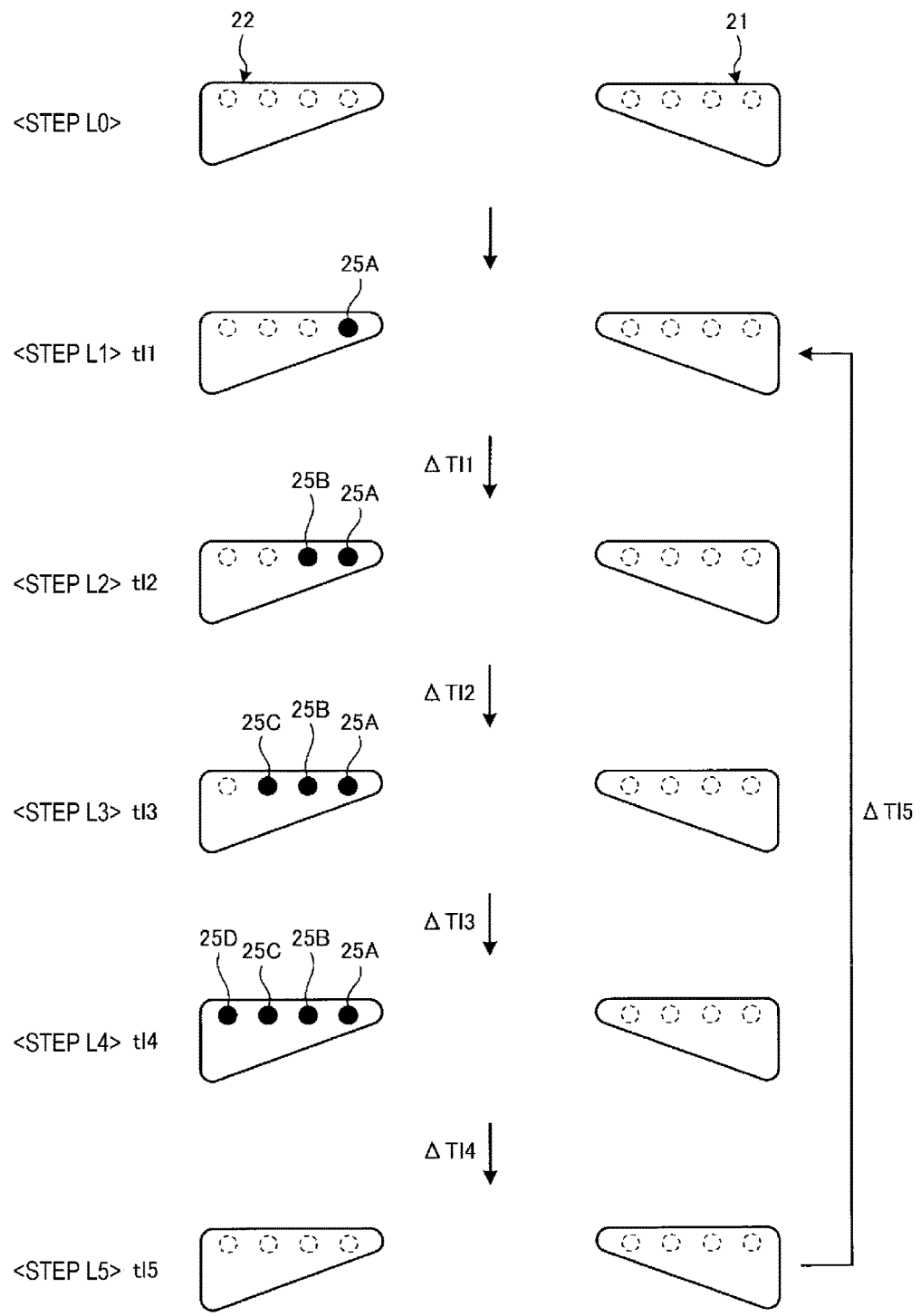
FIG. 5 is a schematic diagram illustrating an example of operations of the turn signal device according to the embodiment.

FIG. 5 is a schematic diagram illustrating an example of operations of the turn signal device 20 when the host vehicle 11 makes a left turn or changes lanes to the left. When turning the host vehicle 11 to the left or changing lanes to the left, the driver of the host vehicle 11 operates the operation device 23 such that the left turn signal 22 operates. As illustrated in FIG. 5, upon the operation device 23 being operated, the plurality of light-emitting units 25 of the left turn signal 22 light up in sequence from the inner side to the outer side with respect to the vehicle width direction.

As illustrated in FIG. 5, before the operation device 23 is operated, the light-emitting units 24 of the right turn signal 21 and the light-emitting units 25 of the left turn signal 22 are unlit (step L0).

Upon the operation device 23 being operated, the light-emitting unit 25A furthest inward with respect to the vehicle width direction lights up at a first point in time t11 (step L1).

After the light-emitting unit 25A has lit up, the light-emitting unit 25B lights up at a second point in time t12 (step L2). The second point in time t12 is a point in time after the first point in time t11 by an amount of time ΔT11. The light-emitting unit 25B lights up with the light-emitting unit 25A remaining lit.

After the light-emitting unit 25B has lit up, the light-emitting unit 25C lights up at a third point in time t13 (step L3). The third point in time t13 is a point in time after the second point in time t12 by an amount of time ΔT12. The light-emitting unit 25C lights up with the light-emitting unit 25A and the light-emitting unit 25B remaining lit.

After the light-emitting unit 25C has lit up, the light-emitting unit 25D lights up at a fourth point in time t14 (step L4). The fourth point in time t14 is a point in time after the third point in time t13 by an amount of time ΔT13. The light-emitting unit 25D lights up with the light-emitting unit 25A, the light-emitting unit 25B, and the light-emitting unit 25C remaining lit.

After the light-emitting unit 25D has lit up, the light-emitting unit 25A, the light-emitting unit 25B, the light-emitting unit 25C, and the light-emitting unit 25D are extinguished at a fifth point in time t15 (step L5). The fifth point in time t15 is a point in time after the fourth point in time t14 by an amount of time ΔT14.

The process returns to step L1 after the light-emitting unit 25A, the light-emitting unit 25B, the light-emitting unit 25C, and the light-emitting unit 25D are extinguished. The amount of time from the fifth point in time t15 to the first point in time t11 is ΔT15.

The operations from step L1 to step L5 are repeated until the operation of the operation device 23 is canceled and the operation signal is no longer being outputted from the operation device 23.

In the present embodiment, the amount of time ΔT11, the amount of time ΔT12, the amount of time ΔT13, the amount of time ΔT14, and the amount of time ΔT15 are the same amount of time.

Note that when parking the host vehicle 11 on the street or when the host vehicle 11 is the rearmost vehicle of a traffic jam, the driver of the host vehicle 11 operates the operation device 23 so as to realize a hazard light function. In other words, when parking the host vehicle 11 on the street or when the host vehicle 11 is the rearmost vehicle of a traffic jam, the driver of the host vehicle 11 operates the operation device 23 such that both the right turn signal 21 and the left turn signal 22 operate. Upon the operation device 23 being operated, the plurality of light-emitting units 24 of the right turn signal 21 and the plurality of light-emitting units 25 of the left turn signal 22 light up in sequence from the inner sides to the outer sides with respect to the vehicle width direction.

In the present embodiment, the turn signal device 20 functions as a warning device that issues a warning to the following vehicle 12 when there is the risk of a collision between the host vehicle 11 and the following vehicle 12. The turn signal device 20 lights up with a different light-up state than the light-up state in a normal state when there is the risk of a collision between the host vehicle 11 and the following vehicle 12.

The normal state includes a state where there is no risk of a collision between the host vehicle 11 and the following vehicle 12, and includes states where the host vehicle 11 makes a right turn, a left turn, and changes lanes while in a state where there is no risk of a collision with the following vehicle 12.

In the description below, a state where there is no risk of a collision between the host vehicle 11 and the following vehicle 12 will be called a "normal state" as appropriate, whereas a state where there is a risk of a collision between the host vehicle 11 and the following vehicle 12 will be called a "dangerous state" as appropriate.

As described with reference to FIGS. 4 and 5, in the normal state, either or both of the plurality of light-emitting units 24 and the plurality of light-emitting units 25 undergo sequential lighting, in which the light-emitting units light up in sequence from the inner side to the outer side with respect to the vehicle width direction.

Figure 6:
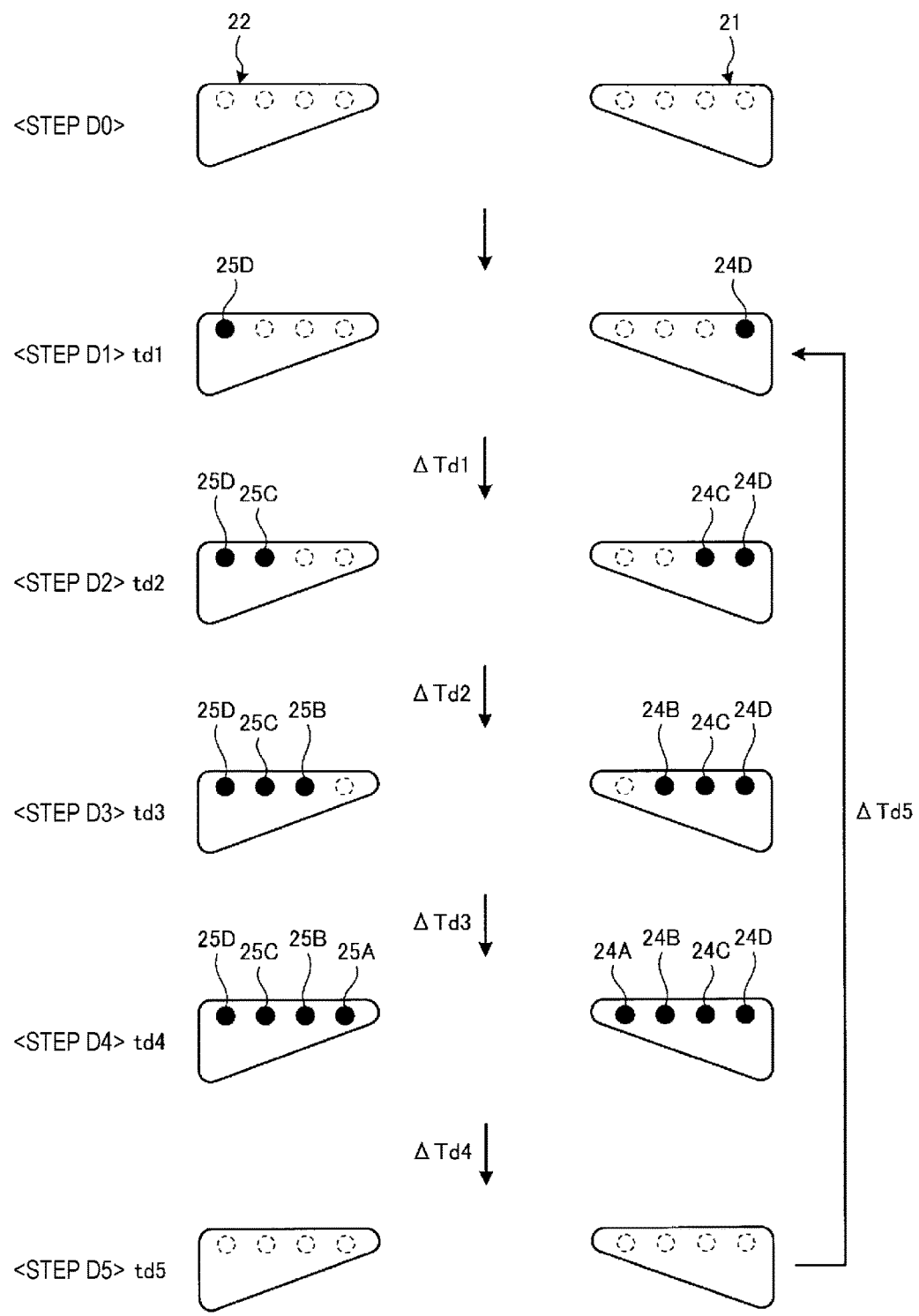
FIG. 6 is a schematic diagram illustrating an example of operations of the turn signal device according to the embodiment.

FIG. 6 is a schematic diagram illustrating an example of operations of the turn signal device 20 when a dangerous state is determined and the host vehicle 11 issues a warning to the following vehicle 12. In the dangerous state, the right turn signal 21 and the left turn signal 22 light up sequentially with a different light-up state than the light-up state used in the normal state.

As illustrated in FIG. 6, in the present embodiment, the plurality of light-emitting units 24 of the right turn signal 21 and the plurality of light-emitting units 25 of the left turn signal 22 light up in sequence from the outer sides to the inner sides with respect to the vehicle width direction.

As illustrated in FIG. 6, before the dangerous state is determined, the light-emitting units 24 of the right turn signal 21 and the light-emitting units 25 of the left turn signal 22 are unlit (step D0).

Upon the dangerous state being determined, the light-emitting unit 24D and the light-emitting unit 25D furthest outward with respect to the vehicle width direction light up at a first point in time td1 (step D1).

After the light-emitting unit 24D and the light-emitting unit 25D have lit up, the light-emitting unit 24C and the light-emitting unit 25C light up at a second point in time td2 (step D2). The second point in time td2 is a point in time after the first point in time td1 by an amount of time ΔTd1. The light-emitting unit 24C and the light-emitting unit 25C light up with the light-emitting unit 24D and the light-emitting unit 25D remaining lit.

After the light-emitting unit 24C and the light-emitting unit 25C have lit up, the light-emitting unit 24B and the light-emitting unit 25B light up at a third point in time td3 (step D3). The third point in time td3 is a point in time after the second point in time td2 by an amount of time ΔTd2. The light-emitting unit 24B and the light-emitting unit 25B light up with the light-emitting unit 24D, the light-emitting unit 25D, the light-emitting unit 24C, and the light-emitting unit 25C remaining lit.

After the light-emitting unit 24B and the light-emitting unit 25B have lit up, the light-emitting unit 24A and the light-emitting unit 25A light up at a fourth point in time td4 (step D4). The fourth point in time td4 is a point in time after the third point in time td3 by an amount of time ΔTd3. The light-emitting unit 24A and the light-emitting unit 25A light up with the light-emitting unit 24D, the light-emitting unit 25D, the light-emitting unit 24C, the light-emitting unit 25C, the light-emitting unit 24B, and the light-emitting unit 25B remaining lit.

After the light-emitting unit 24A and the light-emitting unit 25A have lit up, the light-emitting unit 24D, the light-emitting unit 25D, the light-emitting unit 24C, the light-emitting unit 25C, the light-emitting unit 24B, the light-emitting unit 25B, the light-emitting unit 24A, and the light-emitting unit 25A are extinguished at a fifth point in time td5 (step D5). The fifth point in time td5 is a point in time after the fourth point in time td4 by an amount of time ΔTd4.

After the light-emitting unit 24D, the light-emitting unit 25D, the light-emitting unit 24C, the light-emitting unit 25C, the light-emitting unit 24B, the light-emitting unit 25B, the light-emitting unit 24A, and the light-emitting unit 25A are extinguished, the process returns to step D1. The amount of time from the fifth point in time td5 to the first point in time td1 is ΔTd5.

The operations from step D1 to step D5 are repeated until the dangerous state is no longer present.

In the present embodiment, the amount of time ΔTd1, the amount of time ΔTd2, the amount of time ΔTd3, the amount of time ΔTd4, and the amount of time ΔTd5 are the same amount of time.

When the light-emitting units 24 and the light-emitting units 25 light up sequentially from the outer side to the inner side with respect to the vehicle width direction, the visual effect of the turn signal device 20 creates, for the driver of the following vehicle 12, an illusion that the host vehicle 11 in front is approaching suddenly. As a result, the attention of the driver of the following vehicle 12 can be caught effectively.

Figure 7:
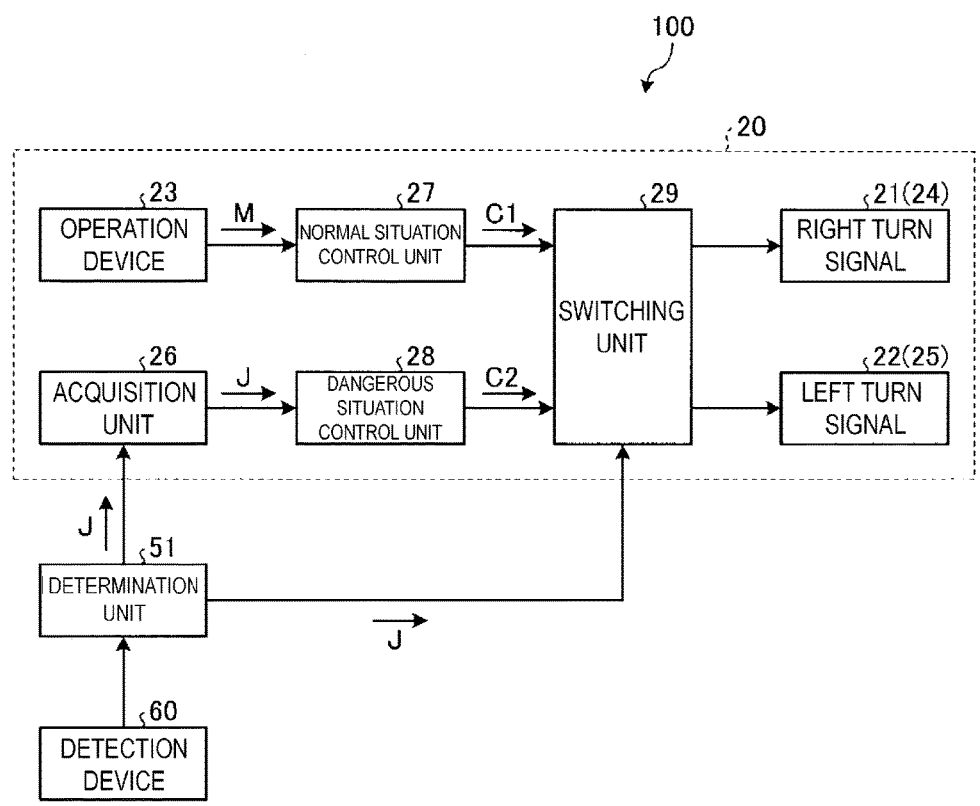
FIG. 7 is a function block diagram illustrating an example of the collision avoidance system according to the embodiment.

FIG. 7 is a function block diagram illustrating an example of the collision avoidance system 100 including the turn signal device 20 according to the present embodiment. As illustrated in FIG. 7, the turn signal device 20 includes: the right turn signal 21, provided on the right side of the rear part of the host vehicle 11, having the plurality of light-emitting units 24 arranged in the vehicle width direction of the host vehicle 11; the left turn signal 22, provided on the left side of the rear part of the host vehicle 11, having the plurality of light-emitting units 25 arranged in the vehicle width direction of the host vehicle 11; the operation device 23, provided in the driver cab of the host vehicle 11, that can generate an operation signal M for causing one or both of the right turn signal 21 and the left turn signal 22 to operate in response to an operation made by the driver; an acquisition unit 26 that acquires a determination signal J indicating a determination result of whether or not there is the risk of a collision between the host vehicle 11 and the following vehicle 12 traveling behind the host vehicle 11; a normal situation control unit 27 that, on the basis of the operation signal M, outputs a normal situation control signal C1 such that either or both of the plurality of light-emitting units 24 of the right turn signal 21 and the plurality of light-emitting units 25 of the left turn signal 22 light up sequentially from the inner side to the outer side with respect to the vehicle width direction; and a dangerous situation control unit 28 that, upon the determination signal J indicating the result of determining whether or not there is the risk of a collision between the host vehicle 11 and the following vehicle 12 is acquired, outputs a dangerous situation control signal C2 such that both of the plurality of light-emitting units 24 of the right turn signal 21 and the plurality of light-emitting units 25 of the left turn signal 22 light up sequentially from the outer side to the inner side with respect to the vehicle width direction.

The turn signal device 20 also includes a switching unit 29 that switches between outputting the normal situation control signal C1 and the dangerous situation control signal C2 to the right turn signal 21 and the left turn signal 22. The switching unit 29 does not simultaneously supply the normal situation control signal C1 and the dangerous situation control signal C2 to the right turn signal 21 and the left turn signal 22. The dangerous situation control signal C2 is not supplied while the normal situation control signal C1 is being supplied to the right turn signal 21 and the left turn signal 22. Likewise, the normal situation control signal C1 is not supplied while the dangerous situation control signal C2 is being supplied to the right turn signal 21 and the left turn signal 22.

The turn signal device 20 has a computer system. The computer system of the turn signal device 20 includes the acquisition unit 26, the normal situation control unit 27, the dangerous situation control unit 28, and the switching unit 29. The computer system of the turn signal device 20 is different from the computer system of the control device 50 in the host vehicle 11. Note that, however, the control device 50 of the host vehicle 11 may include the acquisition unit 26, the normal situation control unit 27, the dangerous situation control unit 28, and the switching unit 29.

The collision avoidance system 100 includes: the turn signal device 20; the detection device 60, provided in the rear part of the host vehicle 11, that detects the following vehicle 12 traveling behind the host vehicle 11 in a non-contact manner; and a determination unit 51 that determines whether or not there is the risk of a collision between the host vehicle 11 and the following vehicle 12 on the basis of a detection result from the detection device 60. The turn signal device 20 is controlled on the basis of a determination result from the determination unit 51.

The operation device 23 is operated by the driver. The operation device 23 generates the operation signal M for causing one or both of the right turn signal 21 and the left turn signal 22 to operate upon the operation device 23 being operated by the driver. The operation signal M is outputted from the operation device 23 to the normal situation control unit 27.

On the basis of the operation signal M, the normal situation control unit 27 outputs the normal situation control signal C1 such that either or both of the plurality of light-emitting units 24 of the right turn signal 21 and the plurality of light-emitting units 25 of the left turn signal 22 light up sequentially from the inner side to the outer side with respect to the vehicle width direction. The plurality of light-emitting units 24 of the right turn signal 21 light up sequentially from the inner side to the outer side with respect to the vehicle width direction in response to the normal situation control signal C1 being supplied to the right turn signal 21, as described with reference to FIG. 4. The plurality of light-emitting units 25 of the left turn signal 22 light up sequentially from the inner side to the outer side with respect to the vehicle width direction in response to the normal situation control signal C1 being supplied to the left turn signal 22, as described with reference to FIG. 5.

The acquisition unit 26 acquires the determination signal J from the determination unit 51. The acquisition unit 26 outputs the acquired determination signal J to the dangerous situation control unit 28.

Upon acquiring a determination signal J indicating a determination result in which there is the risk of a collision between the host vehicle 11 and the following vehicle 12, the dangerous situation control unit 28 outputs the dangerous situation control signal C2 such that both of the plurality of light-emitting units 24 and light-emitting units 25 of the right turn signal 21 and the left turn signal 22 light up sequentially from the outer side to the inner side with respect to the vehicle width direction. The plurality of light-emitting units 24 of the right turn signal 21 light up sequentially from the outer side to the inner side with respect to the vehicle width direction, and the plurality of light-emitting units 25 of the left turn signal 22 light up sequentially from the outer side to the inner side with respect to the vehicle width direction, in response to the dangerous situation control signal C2 being supplied to the right turn signal 21 and the left turn signal 22, as described with reference to FIG. 6.

The switching unit 29 acquires the determination signal J from the determination unit 51. Upon acquiring the determination signal J indicating a determination result that there is the risk of a collision between the host vehicle 11 and the following vehicle 12 while the normal situation control signal C1 is being outputted to one or both of the right turn signal 21 and the left turn signal 22, the switching unit 29 stops the output of the normal situation control signal C1 to the right turn signal 21 and the left turn signal 22, and outputs the dangerous situation control signal C2 to the right turn signal 21 and the left turn signal 22.

Additionally, upon acquiring the determination signal J indicating a determination result that there is no risk of a collision while the dangerous situation control signal C2 is being outputted to the right turn signal 21 and the left turn signal 22, the switching unit 29 stops the output of the dangerous situation control signal C2 to the right turn signal 21 and the left turn signal 22, and outputs the normal situation control signal C1 to one or both of the right turn signal 21 and the left turn signal 22.

The determination unit 51 determines whether or not there is the risk of a collision between the host vehicle 11 and the following vehicle 12 on the basis of the detection result from the detection device 60. The detection device 60 is capable of detecting the presence/absence of the following vehicle 12, the relative position of the following vehicle 12, and the relative velocity of the following vehicle 12. When the relative velocity between the host vehicle 11 and the following vehicle 12 is greater than or equal to a predetermined velocity, and the relative distance between the host vehicle 11 and the following vehicle 12 has fallen within a predetermined distance, the determination unit 51 determines that there is the risk of a collision between the host vehicle 11 and the following vehicle 12.

Additionally, in the present embodiment, the determination unit 51 classifies the risk of a collision between the host vehicle 11 and the following vehicle 12 into a plurality of levels on the basis of the detection result from the detection device 60. In the present embodiment, the risk of a collision between the host vehicle 11 and the following vehicle 12 is classified according to three levels. For example, when the relative distance between the host vehicle 11 and the following vehicle 12 is the predetermined distance, and the following vehicle 12 is approaching the host vehicle 11 at greater than or equal to a first relative velocity and less than a second relative velocity, the determination unit 51 determines the risk of a collision between the host vehicle 11 and the following vehicle 12 to be a first risk level. When the relative distance between the host vehicle 11 and the following vehicle 12 is the predetermined distance, and the following vehicle 12 is approaching the host vehicle 11 at greater than or equal to the second relative velocity and less than a third relative velocity, the determination unit 51 determines the risk of a collision between the host vehicle 11 and the following vehicle 12 to be a second risk level, at which the risk of a collision is greater than at the first risk level. When the relative distance between the host vehicle 11 and the following vehicle 12 is the predetermined distance, and the following vehicle 12 is approaching the host vehicle 11 at greater than or equal to the third relative velocity, the determination unit 51 determines the risk of a collision between the host vehicle 11 and the following vehicle 12 to be a third risk level, at which the risk of a collision is greater than at the second risk level.

Figure 8:
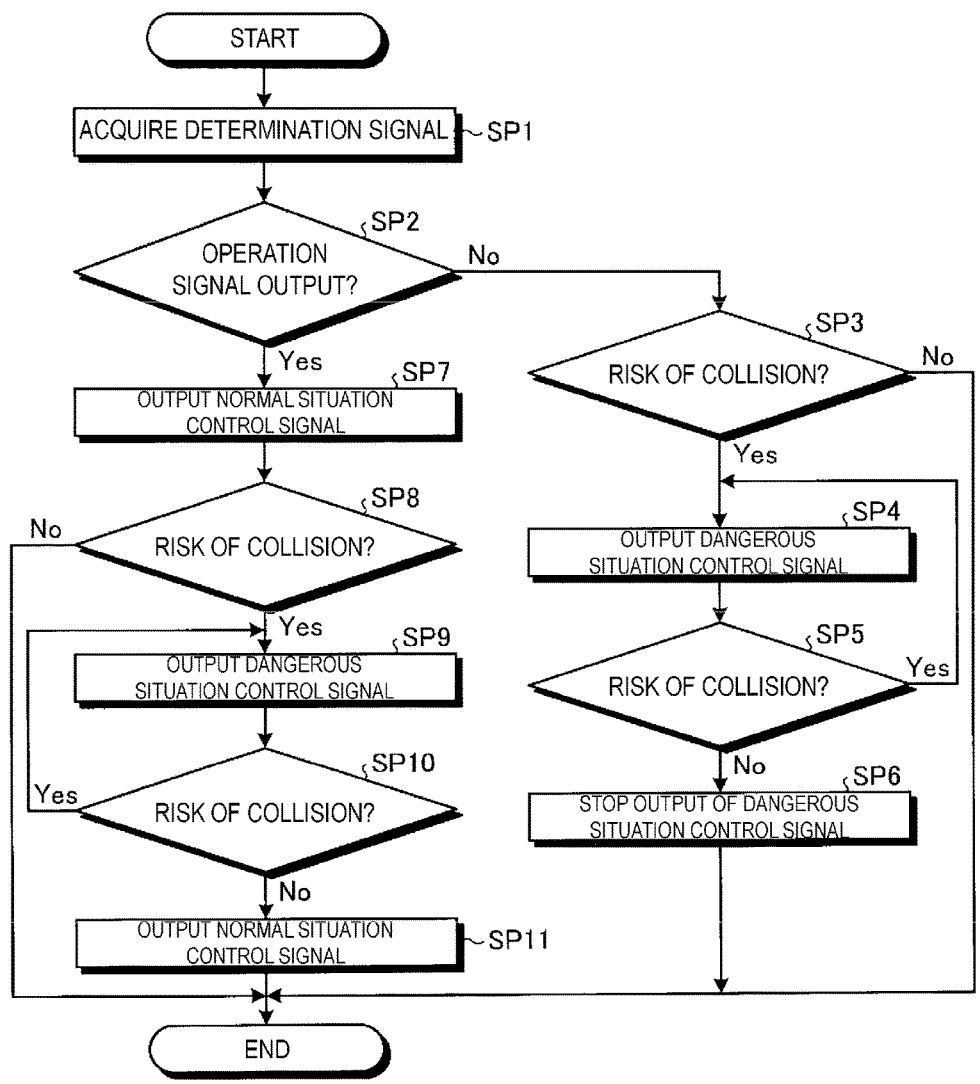
FIG. 8 is a flowchart illustrating an example of operations of the collision avoidance system according to the embodiment.

Next, an example of operations of the collision avoidance system 100 according to the present embodiment will be described with reference to the flowchart in FIG. 8.

The detection device 60 of the host vehicle 11 detects the following vehicle 12 while the host vehicle 11 is traveling. The detection result from the detection device 60 is outputted to the determination unit 51. The determination unit 51 determines whether or not there is the risk of a collision between the host vehicle 11 and the following vehicle 12 on the basis of the detection result from the detection device 60. The determination unit 51 outputs, to the acquisition unit 26, the determination signal J indicating a determination result of whether or not there is the risk of a collision between the host vehicle 11 and the following vehicle 12. The acquisition unit 26 acquires the determination signal J (step SP1). The determination unit 51 continues to output the determination signal J to the acquisition unit 26 while the host vehicle 11 is traveling. The acquisition unit 26 continues to acquire the determination signal J from the determination unit 51 while the host vehicle 11 is traveling.

Additionally, in the present embodiment, the determination unit 51 outputs the determination signal J to the switching unit 29. The determination unit 51 continues to output the determination signal J to the switching unit 29 while the host vehicle 11 is traveling. The switching unit 29 continues to acquire the determination signal J from the determination unit 51 while the host vehicle 11 is traveling.

It is determined whether or not the operation signal M is being outputted while the host vehicle 11 is traveling (step SP2). The operation signal M is generated upon the operation device 23 being operated by the driver of the host vehicle 11 in order to make a right turn, a left turn, or to change lanes while the host vehicle 11 is traveling. The operation device 23 outputs the generated operation signal M to the normal situation control unit 27.

In the case where it is determined that the operation signal M is not being outputted in step SP2 (step SP2: No), or in other words, in the case where it is determined that the operation device 23 is not being operated, the switching unit 29 determines whether or not there is the risk of a collision between the host vehicle 11 and the following vehicle 12 (step SP3). As described above, the determination signal J is outputted to the switching unit 29 from the determination unit 51. The switching unit 29 acquires the determination signal J outputted from the determination unit 51, and determines whether or not there is the risk of a collision between the host vehicle 11 and the following vehicle 12. The switching unit 29 determines that there is no risk of a collision between the host vehicle 11 and the following vehicle 12 upon acquiring the determination signal J indicating a determination result that there is no risk of a collision from the determination unit 51. The switching unit 29 determines that there is the risk of a collision between the host vehicle 11 and the following vehicle 12 upon acquiring the determination signal J indicating a determination result that there is the risk of a collision from the determination unit 51.

In the case where it is determined that there is no risk of a collision in step SP3 (step SP3: No), the process ends; the detection of the following vehicle 12 by the detection device 60 and the output of the determination signal J by the determination unit 51 is continued.

In the case where it is determined that there is the risk of a collision in step SP3 (step SP3: Yes), the switching unit 29 outputs the dangerous situation control signal C2, acquired from the dangerous situation control unit 28, to the right turn signal 21 and the left turn signal 22 (step SP4). The dangerous situation control unit 28 acquires the determination signal J indicating a determination result that there is the risk of a collision from the acquisition unit 26, and generates the dangerous situation control signal C2 on the basis of that determination signal J. The dangerous situation control unit 28 outputs the dangerous situation control signal C2 to the switching unit 29. The switching unit 29 acquires the dangerous situation control signal C2 from the dangerous situation control unit 28. The switching unit 29 outputs the acquired dangerous situation control signal C2 to the right turn signal 21 and the left turn signal 22. As a result, both the plurality of light-emitting units 24 of the right turn signal 21 and the plurality of light-emitting units 25 of the left turn signal 22 light up in sequence from the outer sides to the inner sides with respect to the vehicle width direction, as described with reference to FIG. 6.

The switching unit 29 determines whether or not there is the risk of a collision while the dangerous situation control signal C2 is being outputted (step SP5). For example, in the case where, while the dangerous situation control signal C2 is being outputted, the relative distance between the host vehicle 11 and the following vehicle 12 increases and there is no longer the risk of a collision, the determination unit 51 outputs the determination signal J indicating a determination result that there is no risk of a collision to the acquisition unit 26 and the switching unit 29 on the basis of the detection result from the detection device 60. In the case where the risk of a collision remains, the determination unit 51 continues to output the determination signal J indicating a determination result that there is the risk of a collision.

In the case where it has been determined that there is the risk of a collision in step SP5 (step SP5: Yes), the output of the dangerous situation control signal C2 is continued.

In the case where it has been determined that there is no risk of a collision in step SP5 (step SP5: No), or in other words, in the case where the determination signal J indicating a determination result that there is no risk of a collision has been acquired, the switching unit 29 stops the output of the dangerous situation control signal C2 to the right turn signal 21 and the left turn signal 22 (step SP6). As a result, the operation of the right turn signal 21 and the left turn signal 22 is stopped, and the process ends.

In the case where the operation device 23 has been operated and it is determined that the operation signal M is being outputted in step SP2 (step SP2: Yes), the normal situation control unit 27 generates the normal situation control signal C1 on the basis of the operation signal M. The normal situation control unit 27 outputs the generated normal situation control signal C1 to the switching unit 29. The switching unit 29 outputs the normal situation control signal C1 acquired from the normal situation control unit 27 to at least one of the right turn signal 21 and the left turn signal 22 (step SP7). As a result, either or both of the plurality of light-emitting units 24 of the right turn signal 21 and the plurality of light-emitting units 25 of the left turn signal 22 light up in sequence from the inner sides to the outer sides with respect to the vehicle width direction, as described with reference to FIGS. 4 and 5.

The switching unit 29 determines whether or not there is the risk of a collision while the normal situation control signal C1 is being outputted (step SP8). For example, in the case where the following vehicle 12 suddenly approaches the host vehicle 11 and the risk of a collision has increased while the normal situation control signal C1 is being outputted during a right or left turn or a lane change by the host vehicle 11, the determination unit 51 outputs the determination signal J indicating a determination result that there is the risk of a collision to the acquisition unit 26 and the switching unit 29 on the basis of the detection result from the detection device 60. In the case where there is no risk of a collision, the determination unit 51 continues to output the determination signal J indicating a determination result that there is no risk of a collision.

In the case where it has been determined that there is no risk of a collision in step SP8 (step SP8: No), the host vehicle 11 makes the right or left turn or changes lanes, and the process ends.

In the case where it has been determined that there is the risk of a collision in step SP8 (step SP8: Yes), the switching unit 29 outputs the dangerous situation control signal C2 (step SP9). In other words, when the determination signal J indicating a determination result that there is the risk of a collision is acquired while the normal situation control signal C1 is being outputted, the switching unit 29 stops the output of the normal situation control signal C1 and outputs the dangerous situation control signal C2.

As a result, the turn signal device 20 that had been operating according to the light-up state described with reference to FIGS. 4 and 5 switches to the light-up state described with reference to FIG. 6.

The switching unit 29 determines whether or not there is the risk of a collision while the dangerous situation control signal C2 is being outputted (step SP10). For example, in the case where, while the dangerous situation control signal C2 is being outputted, the relative distance between the host vehicle 11 and the following vehicle 12 increases and there is no longer the risk of a collision, the determination unit 51 outputs the determination signal J indicating a determination result that there is no risk of a collision to the acquisition unit 26 and the switching unit 29 on the basis of the detection result from the detection device 60. In the case where the risk of a collision remains, the determination unit 51 continues to output the determination signal J indicating a determination result that there is the risk of a collision.

In the case where it has been determined that there is the risk of a collision in step SP10 (step SP10: Yes), the output of the dangerous situation control signal C2 is continued.

In the case where it has been determined that there is no risk of a collision in step SP10 (step SP10: No), the switching unit 29 outputs the normal situation control signal C1 (step SP11). In other words, when the determination signal J indicating a determination result that there is no risk of a collision is acquired while the dangerous situation control signal C2 is being outputted, the switching unit 29 stops the output of the dangerous situation control signal C2 and outputs the normal situation control signal C1.

As a result, the turn signal device 20 that had been operating according to the light-up state described with reference to FIG. 6 switches to the light-up state described with reference to FIGS. 4 and 5.

Note that in the present embodiment, the dangerous situation control unit 28 may change one or both of the time at which the plurality of light-emitting units 24 and the plurality of light-emitting units 25 start lighting up, and the light emission amount of those light-emitting units, on the basis of the level of the risk of a collision (the risk level). As described above, in the present embodiment, the level of the risk of a collision between the host vehicle 11 and the following vehicle 12 is classified as a first risk level, a second risk level, or a third risk level. Additionally, as described with reference to FIG. 6, the following is carried out in a dangerous state: the light-emitting unit 24D and the light-emitting unit 25D light up at the first point in time td1; the light-emitting unit 24C and the light-emitting unit 25C light up at the second point in time td2 that follows the first point in time td1 by the amount of time ΔTd1; the light-emitting unit 24B and the light-emitting unit 25B light up at the third point in time td3 that follows the second point in time td2 by the amount of time ΔTd2; the light-emitting unit 24A and the light-emitting unit 25A light up at the fourth point in time td4 that follows the third point in time td3 by the amount of time ΔTd3; the light-emitting unit 24D, the light-emitting unit 25D, the light-emitting unit 24C, the light-emitting unit 25C, the light-emitting unit 24B, the light-emitting unit 25B, the light-emitting unit 24A, and the light-emitting unit 25A are extinguished at the fifth point in time td5 that follows the fourth point in time td4 by the amount of time ΔTd4; and the light-emitting unit 24D and the light-emitting unit 25D light up again at the first point in time td1 that follows the fifth point in time td5 by the amount of time ΔTd5. The amount of time ΔTd1, the amount of time ΔTd2, the amount of time ΔTd3, the amount of time ΔTd4, and the amount of time ΔTd5 may be changed on the basis of the risk level. For example, the amount of time ΔTd1, the amount of time ΔTd2, the amount of time ΔTd3, the amount of time ΔTd4, and the amount of time ΔTd5 used at the first risk level, which is a low risk level, may be set to be longer than the amount of time ΔTd1, the amount of time ΔTd2, the amount of time ΔTd3, the amount of time ΔTd4, and the amount of time ΔTd5 used at the second risk level, which is a higher risk level. Likewise, the light emission amount (light intensity) of the light-emitting units 24 and the light-emitting units 25 used at the third risk level, which is a high risk level, may be set to be higher than the light emission amount (light intensity) of the light-emitting units 24 and the light-emitting units 25 used at the first risk level, which is a low risk level.

As described above, according to the present embodiment, in the case where there is a high risk of a collision between the host vehicle 11 and the following vehicle 12, the sequentially-lighting turn signal device 20 can effectively catch the attention of the driver of the following vehicle 12 by sequentially lighting up in a light-up state that is different from the light-up state used in the normal state. As a result, the driver of the following vehicle 12 can take actions to avoid colliding with the host vehicle 11. A collision between the host vehicle 11 and the following vehicle 12 is thus avoided.

Additionally, according to the present embodiment, in the case where the following vehicle 12 has suddenly approached the host vehicle 11 while at least one of the right turn signal 21 and the left turn signal 22 is operating on the basis of the normal situation control signal C1, the control signal supplied to the right turn signal 21 and the left turn signal 22 is switched from the normal situation control signal C1 to the dangerous situation control signal C2. In other words, the dangerous situation control signal C2 is prioritized over the normal situation control signal C1 when the state changes from the normal state to the dangerous state. As a result, the attention of the driver of the following vehicle 12 can be caught effectively even when the host vehicle 11 is making a right or left turn or changing lanes.

Additionally, according to the present embodiment, in the case where it has been determined that there is no longer the risk of a collision while the right turn signal 21 and the left turn signal 22 are operating on the basis of the dangerous situation control signal C2, the control signal supplied to the right turn signal 21 and the left turn signal 22 is switched from the dangerous situation control signal C2 to the normal situation control signal C1. As a result, the advancement direction of the host vehicle 11 can be communicated to the perimeter.

Additionally, the attention of the driver of the following vehicle 12 can be effectively caught by changing one or both of the time at which the plurality of light-emitting units 24 and the plurality of light-emitting units 25 start lighting up, and the light emission amount of those light-emitting units, on the basis of the risk level.

The invention claimed is:

1. A turn signal device comprising:
a right turn signal, provided on a right side of a rear part of a host vehicle, the right turn signal having a plurality of light-emitting units arranged in a vehicle width direction of the host vehicle;
a left turn signal, provided on a left side of the rear part of the host vehicle, the left turn signal having a plurality of light-emitting units arranged in the vehicle width direction of the host vehicle;
an operation device, provided in a driver cab of the host vehicle, the operation device being capable of generating an operation signal for causing one or both of the right turn signal and the left turn signal to operate in response to an operation made by a driver;
an acquisition unit that acquires a determination signal indicating a determination result of whether or not there is a risk of a collision between the host vehicle and a following vehicle traveling behind the host vehicle;
a normal situation control unit that, on the basis of the operation signal, outputs a normal situation control signal such that the plurality of light-emitting units in one or both of the right turn signal and the left turn signal light up sequentially from an inner side to an outer side with respect to the vehicle width direction at constant time intervals, wherein the normal situation control unit outputs the normal situation control signal such that after a first light-emitting unit of the plurality of light-emitting units lights up, a second light-emitting unit of the plurality of light-emitting units lights up while the first light-emitting unit lights up; and
a dangerous situation control unit that, upon the determination signal indicating a determination result that there is a risk of the collision being acquired, outputs a dangerous situation control signal such that the plurality of light-emitting units in both of the right turn signal and the left turn signal light up sequentially from the outer side to the inner side with respect to the vehicle width direction at constant time intervals, wherein the dangerous situation control unit outputs the dangerous situation control signal such that after the first light-emitting unit of plurality of light-emitting units lights up, the second light-emitting unit lights up while the first light-emitting unit lights up.

2. The turn signal device according to claim 1, further comprising:
a switching unit that, upon the determination signal indicating a determination result that there is a risk of the collision being acquired while the normal situation control signal is being outputted, stops the output of the normal situation control signal and outputs the dangerous situation control signal.

3. The turn signal device according to claim 2,
wherein upon the determination signal indicating a determination result that there is no risk of the collision being acquired while the dangerous situation control signal is being outputted, the switching unit stops the output of the dangerous situation control signal and outputs the normal situation control signal.

4. The turn signal device according to claim 3,
wherein the dangerous situation control unit changes one or both of a time at which the respective pluralities of light-emitting units start lighting up, and a light emission amount of those light-emitting units, on the basis of a level of the risk of the collision.

5. A collision avoidance system comprising:
a detection device, provided in a rear part of a host vehicle, the detection device detecting a following vehicle traveling behind the host vehicle in a non-contact manner;
a determination unit that, on the basis of a detection result from the detection device, determines whether or not there is a risk of a collision between the host vehicle and the following vehicle; and
the turn signal device according to claim 4, the turn signal device being controlled on the basis of a determination result from the determination unit.

6. A collision avoidance system comprising:
a detection device, provided in a rear part of a host vehicle, the detection device detecting a following vehicle traveling behind the host vehicle in a non-contact manner;
a determination unit that, on the basis of a detection result from the detection device, determines whether or not there is a risk of a collision between the host vehicle and the following vehicle; and
the turn signal device according to claim 3, the turn signal device being controlled on the basis of a determination result from the determination unit.

7. A collision avoidance system comprising:
a detection device, provided in a rear part of a host vehicle, the detection device detecting a following vehicle traveling behind the host vehicle in a non-contact manner;
a determination unit that, on the basis of a detection result from the detection device, determines whether or not there is a risk of a collision between the host vehicle and the following vehicle; and
the turn signal device according to claim 2, the turn signal device being controlled on the basis of a determination result from the determination unit.

8. The turn signal device according to claim 2,
wherein the dangerous situation control unit changes one or both of a time at which the respective pluralities of light-emitting units start lighting up, and a light emission amount of those light-emitting units, on the basis of a level of the risk of the collision.

9. A collision avoidance system comprising:
a detection device, provided in a rear part of a host vehicle, the detection device detecting a following vehicle traveling behind the host vehicle in a non-contact manner;
a determination unit that, on the basis of a detection result from the detection device, determines whether or not there is a risk of a collision between the host vehicle and the following vehicle; and
the turn signal device according to claim 8, the turn signal device being controlled on the basis of a determination result from the determination unit.

10. The turn signal device according to claim 1,
wherein the dangerous situation control unit changes one or both of a time at which the respective pluralities of light-emitting units start lighting up, and a light emission amount of those light-emitting units, on the basis of a level of the risk of the collision.

11. A collision avoidance system comprising:
a detection device, provided in a rear part of a host vehicle, the detection device detecting a following vehicle traveling behind the host vehicle in a non-contact manner;
a determination unit that, on the basis of a detection result from the detection device, determines whether or not there is a risk of a collision between the host vehicle and the following vehicle; and the turn signal device according to claim 10, the turn signal device being controlled on the basis of a determination result from the determination unit.

12. A collision avoidance system comprising:

a detection device, provided in a rear part of a host vehicle, the detection device detecting a following vehicle traveling behind the host vehicle in a non-contact manner;

a determination unit that, on the basis of a detection result from the detection device, determines whether or not there is a risk of a collision between the host vehicle and the following vehicle; and the turn signal device according to claim 1, the turn signal device being controlled on the basis of a determination result from the determination unit.

* * * * *